United States Patent [19]
Lee et al.

[11] 4,087,695
[45] May 2, 1978

[54] METHOD FOR PRODUCING OPTICAL BAFFLING MATERIAL USING PULSED ELECTRON BEAMS

[75] Inventors: John N. Lee, Silver Spring; Robert B. Oswald, Jr., Bethesda, both of Md.

[73] Assignee: The United States of America as represented by the Secretary of the Army, Washington, D.C.

[21] Appl. No.: 759,707

[22] Filed: Jan. 17, 1977

[51] Int. Cl.² .................. G02B 27/00; A61K 27/02
[52] U.S. Cl. ........................... 250/492 B; 250/510; 350/276 R
[58] Field of Search ............. 250/492, 492 B, 310, 250/510, ; 350/276 R

[56] References Cited
U.S. PATENT DOCUMENTS

| | | | |
|---|---|---|---|
| 2,702,863 | 2/1955 | Koch | 250/492 B |
| 3,354,064 | 11/1967 | Letter | 250/492 B |

*Primary Examiner*—Harold A. Dixon
*Attorney, Agent, or Firm*—Nathan Edelberg; Robert P. Gibson; Saul Elbaum

[57] ABSTRACT

A method for producing durable optical baffling materials comprising polishing to a mirror finish the surface of a starting material, preferably having a very fine-grained structure, and then bombarding the surface of the starting material with low energy (0 to 50 keV) pulsed electrodes at a pulse length of about 0.1 microseconds. A fluence of 0.5 cal/cm² renders the surface completely black in appearance, retaining none of its initial mirror-like properties.

9 Claims, 1 Drawing Figure

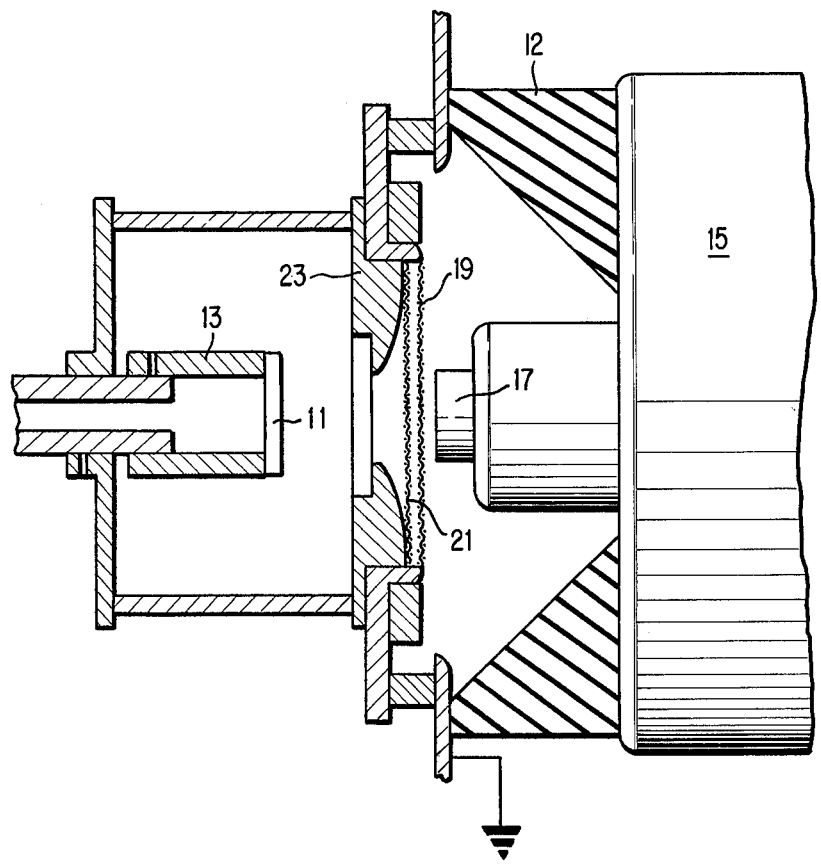

METHOD FOR PRODUCING OPTICAL BAFFLING MATERIAL USING PULSED ELECTRON BEAMS

RIGHTS OF THE GOVERNMENT

The invention described herein may be manufactured, used and licensed by or for the United States Government for governmental purposes without the payment to us of any royalty thereon.

BACKGROUND OF THE INVENTION

1. Field of the Invention

This invention relates to a process for producing optical baffling material.

2. Description of the Prior Art

Optical baffling materials act as light traps to prevent stray or unwanted light from entering an optical system. These materials should absorb as much of the incident radiation as possible. For many applications, it is desirable that any of the radiation that is not absorbed, but is scattered or reflected off the surface of the materials, be scattered diffusely, rather than specularly as in a mirror.

Conventional optical baffling materials have not been as effective as might be desired. Materials such as paints or powders can be easily rubbed off or flake off after short periods of use in rugged thermal or shock environments. On the other hand, anodized coatings which can be quite durable are often not good diffuse reflectors.

SUMMARY OF THE INVENTION

It has been found, in accordance with the invention, that a durable optical baffling material is made by the steps of providing a starting material, polishing the surface of the starting material to a mirror finish, and bombarding the surface of the starting material with a pulsed beam of electrons to make the surface appear black in color.

More particularly, it has been found that a glassy carbon sample or a thin anodized film of beryllium oxide on a beryllium substrate can be polished to a mirror finish, and subsequent bombardment with a pulsed beam of electrons having energies over the range of 0 through 50 keV and a pulse length of 0.1 microseconds renders the surface completely black in appearance, such that none of its initial mirror-like properties are retained.

Accordingly, it is an object of this invention to provide an improved method for producing an optical baffling material.

It is another object of this invention to provide an improved method for producing a durable optical baffling material.

It is yet another object of this invention to provide a durable optical baffling material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE is a sectional view of a pulsed electron beam generator for producing durable optical baffling materials according to the invention.

DESCRIPTION OF THE PREFERRED EMBODIMENT

The preferred method for making an optical baffling material comprises the steps of providing a starting material, polishing the surface of the starting material to a mirror finish, and then bombarding the surface of the starting material with a pulsed beam of electrons to make the surface appear black in color.

The pulsed electron beam bombardment apparatus is conventional and can be as shown in the FIGURE. For example, it could be a pulsed electron beam generator such as model SPI-5000 manufactured by Simulation Physics Company, Burlington, Massachusetts. The sample 11 to be exposed to the electron beam is mounted against a sample holder 13. The cathode shank 15 is connected to a store of electrons such as a storage capacitor (not shown) for supplying electrons to the cathode 17. A pulsed electron beam is produced when the capacitor store is electrically connected to the cathode 17, resulting in a large voltage potential between it and a tungsten mesh anode 19 which is electrically insulated from the cathode 17 by the insulator 12 and vacuum. The pulsed electron beam then continues on through the anode to a tungsten mesh attenuator 21 and enters a guide cone 23 where it is directed onto the exposed surface of the sample 11. The entire assembly is evacuated to a pressure less than $10^{-4}$ torr.

The bombardment with electrons is preferably carried out with a low energy, pulsed electron beam (average energy 25 keV), with a spectrum ranging from 0 to 50 keV and a pulse length of about 0.1 microseconds. A fluence of 0.5 cal/cm$^2$ renders the exposed surface of the sample completely black in appearance, retaining none of its initial mirror-like properties.

The mechanism by which these surfaces are produced is clearly involved with rapid surface heating. The maximum electron range for the beam used is only about 10 micrometers. It appears preferable to use materials with a very fine-grained structure, as exposure of large-grained materials, such as beryllium metal, with this beam results in a different damage morphology related to grain boundaries and grain distortions.

For a clearer understanding of this invention, specific examples of it are set forth below. These examples are merely illustrative and are not to be understood as limiting the scope and underlying principles of this invention in any way.

EXAMPLE 1

Four samples of glassy carbon (100 series samples) having a density of 1.52 gram/cm$^3$ and three samples of glassy carbon (200 series samples) having a density in the range of 1.43 to 1.50 grams/cm$^3$ were provided as starting materials. Glassy carbon is manufactured by the Lockheed Corporation Research Laboratory in Palo Alto, California. Glassy-carbon is a pure amorphous nongraphitized form of carbon. Scanning-electron microprobe analysis of the surface of some of the glassy-carbon samples indicated pure carbon composition. However, some impurities seemed to be embedded in the surface at discrete locations. These granular impurities apparently resulted from polishing; cleaning procedures could not remove them. More strenuous efforts would probably have damaged the optical polish. Scanning-electron microprobe analyses showed that they were mainly comprised of Ca, Si, Fe, Al, Cl, and Ti with Ca, Si, and Fe being predominant. It is estimated that these small spots covered about 2% of the surface.

According to Lockheed Missiles and Space Company Report 6-78-69-33, August 1969, the basic glassy-carbon structure is made up of trigonal linkages which are related to the turbostratic precursor polymer structure. No significant degree of structural order has been found. The internal pore structure is unconnected, quite small in size, and uniformly dispersed. The density of the material is related to that of graphite to give a ratio indicating that the material is about 35 percent porous.

The crystalline characteristics as determined by x-ray diffraction are as follows:

| | |
|---|---|
| $L_c$, A | 19 |
| d, A | 3.56 |
| Average pore radius, A | 12(100 series samples) |
| | 18(200 series samples) |
| Average distance between pores, A | 54(100 series samples) |
| | 63(200 series samples) |

The samples were cleaned in a clean-room with reagent-grade Acetone using polyurethane swabs to prevent scratching. Then using new polyurethane swabs, the samples were cleaned a second time with reagent-grade trichloroethylene. Next, the surfaces of the samples were polished to a mirror finish using slurries of abrasive powders of decreasing grain sizes. After this step, they were inserted in the pulsed electron beam generator and bombarded with electrons (average energy 25 keV) with a spectrum ranging from 0 to 50 keV and a pulse length of about 0.1 microseconds at a fluence of 0.5 cal/cm$^2$.

EXAMPLE 2

Three samples in the form of a thin anodized film of beryllium oxide (BeO) on top of a polished beryllium metal substrate were provided as starting materials. The samples were anodized in a 10% Na$_2$CrO$_4$ (sodium chromate) to water bath whose ph had been adjusted to 4.0 by addition of crystalline CrO$_3$ (chromic acid anhydride). The negative electrode was stainless steel and the samples were placed ½ inch away. The following voltages and currents were recorded:

| | | |
|---|---|---|
| Sample #1 | 0.90 amp/in$^2$ | 6.4 volts |
| Sample #2 | 1.00 amp/in$^2$ | 6.5 volts |
| Sample #3 | 1.00 amp/in$^2$ | 6.6 volts |

Sample #2 was later baked at 300° C for 1 hour with a slow heat and cool cycle.

The samples were cleaned by rubbing lightly with detergent solution and water on a cotton swab. Next, the surfaces of the samples were polished to a mirror finish using slurries of abrasive powders of increasing grain size. After this step, they were inserted in the pulsed electron beam generator and bombarded with electrons (average energy 25 keV) with a spectrum ranging from 0 to 50 keV and a pulse length of about 0.1 microseconds at a fluence of 0.5 cal/cm$^2$.

PERFORMANCE TESTS

No differences were noted in the visual appearance of the black exposed regions for the two materials. The production of two very similar appearance surfaces on two very different materials would indicate that the effect may be rather general, and that other materials when irradiated may produce even better surfaces for baffle materials.

A two milliwatt helium-neon laser beam was directed onto the black exposed region of the treated samples, and no visible reflected ray could be detected. This indicates that the reflected radiation was diffuse. The intensity of the laser spot striking the black region, as viewed by the naked eye, was no more intense and in many cases was less intense than the visibility of the laser beam off the mirror-like part of the sample. Since a mirror is visible only because of imperfections on the surface (e.g., dust, surface roughness) and these produce scatter intensities orders of magnitude less than the incident intensity, this means that the absorptivity of the black region is good — most probably greater than 95% at the wavelength used (6328A). Similar absorptivity should be expected throughout the visible wavelength range.

Results of surface durability tests indicated that cleaning with agents such as Acetone and Methanol do not change the appearance or properties of the black surface produced by the electron beam.

We wish it to be understood that we do not desire to be limited to the exact details of construction shown and described, for obvious modifications can be made by persons skilled in the art.

What is claimed as new and desired to be secured by Letters Patents of the U.S. is:

1. A method of producing a durable optical baffling material comprising the steps of:
   providing a starting material;
   polishing the surface of the starting material to a mirror finish; and
   bombarding the surface of the starting material with a pulsed beam of electrons having a pulse length of about 0.1 microseconds to make the surface appear black in color.

2. The method of producing a durable optical baffling material recited in claim 1 wherein the providing step comprises:
   providing a starting material with a fine-grained structure.

3. The method of producing a durable optical baffling material recited in claim 1 wherein the bombarding step comprises:
   bombarding the surface of the starting material with a pulsed beam of electrons having an average energy of 25 keV. to make the surface appear black in color.

4. The method of producing a durable optical baffling material recited in claim 1 wherein the bombarding step comprises:
   bombarding the surface of the starting material with a pulsed beam of electrons having an energy in the range of 0 to 50 keV. to make the surface appear black in color.

5. The method of producing a durable optical baffling material recited in claim 1 wherein the bombarding step comprises:
   bombarding the surface of the starting material with a pulsed beam of electrons at a fluence of 0.5 cal/cm$^2$ to make the surface area appear black in color.

6. The method of producing optical baffling material recited in claim 1 wherein the providing step comprises:
   providing a starting material consisting of a thin, anodized film of beryllium oxide.

7. The method of producing optical baffling material recited in claim 1 wherein the providing step comprises:
  providing a starting material consisting of glassy carbon.

8. A method of producing a durable optical baffling material comprising the steps of:
  providing a starting material consisting of a thin, anodized film of beryllium oxide; and
  bombarding the surface of the starting material with a pulsed beam of electrons to make the surface appear black in color.

9. A method of producing a durable optical baffling material comprising the steps of:
  providing a starting material consisting of glassy carbon; and
  bombarding the surface of the starting material with a pulsed beam of electrons to make the surface appear black in color.

* * * * *